(12) United States Patent
Gabrys

(10) Patent No.: US 6,828,710 B1
(45) Date of Patent: Dec. 7, 2004

(54) AIRGAP ARMATURE

(76) Inventor: Christopher W. Gabrys, 900 S. Meadows Pkwy. #3513, Reno, NV (US) 89511

( * ) Notice: Subject to any disclaimer, the term of this patent is extended or adjusted under 35 U.S.C. 154(b) by 32 days.

(21) Appl. No.: 10/224,802

(22) Filed: Aug. 21, 2002

Related U.S. Application Data

(60) Provisional application No. 60/358,110, filed on Feb. 19, 2002.

(51) Int. Cl.[7] .............................. H02K 1/00; H02K 3/00
(52) U.S. Cl. ........................ 310/179; 310/254; 310/260
(58) Field of Search ................................ 310/179, 180, 310/184, 189, 192, 254, 260, 268, 258

(56) References Cited

U.S. PATENT DOCUMENTS

| 4,634,191 A | * | 1/1987 | Studer | 310/90.5 |
|---|---|---|---|---|
| 4,645,961 A | | 2/1987 | Malsky | 310/156 |
| 4,818,905 A | | 4/1989 | Lender | 310/42 |
| 4,883,981 A | | 11/1989 | Gerfast | 310/40 |
| 4,937,485 A | | 6/1990 | Mihalko | 310/208 |
| 4,959,578 A | * | 9/1990 | Varga | 310/268 |
| 6,069,424 A | | 5/2000 | Colello et al. | 310/58 |
| 6,118,202 A | | 9/2000 | Pinkerton | 310/178 |
| 6,166,472 A | | 12/2000 | Pinkerton | 310/208 |
| 6,208,056 B1 | | 3/2001 | Perkins | 310/179 |

* cited by examiner

*Primary Examiner*—Thanh Lam
(74) *Attorney, Agent, or Firm*—J. Michael Neary

(57) ABSTRACT

An improved airgap armature for use in brushless rotary electrical machines is constructed with multiple phase windings comprised of wires that are wound onto and bonded to a supporting form constructed from nonmagnetic and electrically nonconductive material. The form has two ends, each with features for holding end turns of the multiple phase windings. The multiple phase windings have active lengths and end turns, with the active lengths being located on one side of the form and the end turns located on the opposite side of the form. The active lengths, which are located in the armature airgap of the electrical machine, lie flat against the form for minimal thickness, and the airgap armature can achieve maximum winding density. The form provides an easy method for winding as well as increased structural integrity in the final armature to enable it to transfer torque between the rotor and stationary housing.

32 Claims, 16 Drawing Sheets

AIRGAP ARMATURE

This relates to U.S. Provisional Application Ser. No. 60/358,110 filed on Feb. 19, 2002 and entitled "Airgap armature for Inductor Alternator Machine."

This invention pertains to electrical machines and more particularly to an airgap armature for use in brushless rotary electrical machines that convert between electrical and mechanical energy. The airgap armature provides for increased fill of windings in the active region while minimizing the airgap thickness. The airgap armature further provides high efficiency and allows for higher power energy conversion with reduced inductance, increased structural integrity, and simplified and less costly manufacturing compared to prior armatures.

BACKGROUND OF THE INVENTION

Rotating electrical machines that convert between electrical and mechanical energy are comprised of a rotor portion and a stator portion. In brushless machines, which are preferred for long term reliable operation, stationary armature coils interact with a rotating magnetic field from the rotor. Voltage is induced in armature coils as the rotor rotates, thereby generating power. Likewise, synchronized power can be applied to the armature coils to cause the rotor to rotate, thereby acting as a motor. The armature coils are the key to the conversion between electrical and mechanical energy.

Armature coils have conventionally been wound into slots of lamination stacks in the stator. The slots have served several functions that include providing a low reluctance magnetic path, providing mechanical reinforcement of the coils for transfer of torque and providing an efficient path for conducting heat from the coils. Unfortunately, the use of slotted lamination stacks also has numerous deficiencies, such as magnetic losses caused by variations in the total flux in the electrical machine during rotation. This is particularly important in electrical machines that operate at high power levels, electrical machines that employ unlaminated structures in the field flux path or in applications requiring high efficiency. In addition, these losses cause heating that can shorten operating life. The slotted lamination stacks also increase the inductance of the armature coils, which lowers the power capability, reduces high-speed performance and makes electronic control more difficult. Furthermore, the use of slot winding results in cogging and the slotted configuration reduces the allowable area for placement of armature windings.

To avoid these problems, armatures can be wound as airgap or air core coils. The coils are wound without ferromagnetic cores. The coils are then placed in the magnetic air gap between the rotor and stator. The wound armature windings are can be assembled and bonded together to achieve reinforcement for transfer of torque and to conduct heat from the coils. Unfortunately, winding the armature coils and assembling for later bonding into the stator is difficult and expensive. The bonding to the stator makes such armatures not replaceable and this method is also not possible for use in electrical machines in which both sides of the airgap rotate.

An alternative method for airgap armatures is to wind armature coils and bond them into a reinforced cartridge that is inserted between the rotor and stator. The cartridge can provide the structural rigidity to prevent contact with the rotor and to transfer torque to the stator. To date though, designs and fabrication methods of these armatures have had significant deficiencies. The cartridges require many steps to fabricate and hence are costly. They require multiple individual pieces for fabrication and processes. Coils are each wound individually and then later assembled together using multiple steps. These multi-coil cartridge constructions generally require an undesirably wide airgap thickness, provide marginal structural integrity and low winding density, and are relatively costly.

SUMMARY OF THE INVENTION

The invention provides an improved airgap armature for use in brushless rotary electrical machines. The airgap armature is constructed with multiple phase windings comprised of wires that are wound onto and bonded to a supporting form. The form has two ends, each with features for holding end turns of the multiple phase windings. The multiple phase windings have active lengths and end turns, with the active lengths being located on one side of the form and the end turns located on the opposite side of the form. The active lengths, which are located in the armature airgap of the electrical machine, thereby have a minimized thickness by lying down against the form and the airgap armature can achieve maximum winding density. The end turns are held in place while the form provides an easy method for winding as well as increased structural integrity in the final armature. Although the thickness of the form results in an increased airgap thickness in the active region, the form, in the regions containing the active lengths of the windings, can be made thin, and the benefits of the invention outweigh the increased thickness.

The supporting form is preferably constructed from non-magnetic and nonconductive material to reduce or eliminate eddy current and hysteresis losses. One preferred material is fiberglass laminate that is readily available as manufactured forms, such as sheets and tubes. Because the winding is done onto the form, no handling or assembling of prewound coils is required, reducing manufacturing steps and costs. After winding, the windings are preferably bonded together and to the form to yield a strong and rigid structure that is capable of transmitting reaction torque to the stator. The form can then be simply bolted or mounted into the electrical machine. Unlike printed circuit windings, the form is wound using wires resulting in much higher power capability, winding density and reduced eddy current losses. Multiple individual wires can be used or multiple strand individually insulated conductor wire for further reduction of eddy current losses if desired.

Because of the high winding density and minimized thickness capability of the airgap armature, it is particularly well suited for use in alternators or inductor alternators. Such machines use current applied to a field coil to generate the magnetic flux that passes through the armature windings. Therefore, the requirement for a thin airgap armature is more critical than for permanent magnet machines in order to reduce the required field coil current. One such preferred configuration of inductor alternator for use with the airgap armature has a rotor constructed from ferromagnetic material with multiple circumferentially spaced protrusions. The protrusions face the airgap armature. A coaxial field coil generates homopolar flux in the protrusions and induces alternating current in the multiple phase windings of the airgap armature as the rotor rotates. The high efficiency and reduced complexity of this construction matches the benefits of the airgap armature of the invention. The airgap armature is also applicable for use in permanent magnet excited electrical machines. In these machines, the invention can reduce the required amount of permanent magnet material or increase the power capability.

The increased structural integrity and rigidity of the airgap armature provided by the invention also makes it particularly well suited for use in electrical machines where both sides of the airgap armature are bounded by surfaces of the rotating rotor. This type of electrical machine can eliminate the need for electrical laminations and therefore can achieve even higher efficiency, improvements of typically 3–4%. The airgap armature is used to transfer all torque between the rotor and stationary housing. For high power electrical machines, this torque can be hundreds of inch-pounds or higher. Another advantage of this type of electrical machine is reduced costs from eliminating the need for expensive laminations.

In one embodiment of the invention, the multiple phase windings are wound as serpentine paths around a circumference that is coaxial with the axis or rotation of the rotor. Use of serpentine windings in the airgap armature can provide numerous benefits, including increased structural integrity and rigidity, easier and lower cost manufacturing, and reduced inductance for higher power capability. The windings are inherently structurally linked together by the end turns around the circumference of the armature and the potting of the armature after winding. Multiple serpentine coils are electrically connected in series or parallel to form a complete phase and multiple phases follow sequentially in circumferential position phase to substantially fill the armature structure with conductors. The windings provide support for high power transfer of torque and a power-wise proportionally small airgap. The use of the serpentine windings can eliminate the need to make electrical connections to multiple coils of a single phase around the circumference.

The features on the ends of the supporting form can be holes, slots (elongated holes), pegs, castellations, or any construction that sufficiently holds the end turns on the opposite side of the form as the active lengths and preferably facilitates easier winding. Such features can be molded into the form or alternatively the form can be machined, waterjet cut or laser cut with the features. When using through holes, the multiple phase windings pass through the through holes while traversing between the active lengths and the end turns. Preferably, only one phase of windings passes through each through hole. When using pegs, the multiple phase windings pass between pegs while traversing between the active lengths and the end turns. A similar open end feature construction can also be achieved using holes that have slots to the ends for easier winding of the wires. In a further embodiment of the invention, the manufacturing rate of the airgap armature can be further increased in open end feature forms. The multiple phase windings are wound on to the form simultaneously by placement of the phase active lengths of different phases in succession around the circumference of the airgap armature wherein the windings placed in end features alternate phases and the winding direction between end features also alternates. This eliminates the need for threading windings and allows for much higher speed winding. The winding can be done by hand or by a winding machine. The windings can alternatively be constructed as coils instead of serpentines if desired. Multiple coils can be connected in series of parallel and series coils could alternatively be wound together consecutively around the circumference.

Unlike some airgap armatures that use conductor tension to hold the placement of multiple pieces, making them only useable for axial gap machines that have radial active lengths, the invention is suitable for use in both axial gap and radial gap electrical machines. When used in radial gap machines, the form can be machined in a tubular shape or alternatively, the form can be machined with end features while being substantially flat for lower cost fabrication. The form is then rolled and secured into a cylindrical shape. It may be made as a light weight cylinder attached to one or more ring structures to accurately hold its circular cross-section. The ring structures can be located outside the active lengths or at the ends of the form so as to not increase the airgap thickness.

The bonding of the windings after winding substantially increases the structural integrity and rigidity of the airgap armature, facilitates heat transfer from the windings, and prevents moisture penetration. The bonding can be by vacuum resin impregnation, and a mold or vacuum bag can be utilized to assure an accurate final shape as well as to squeeze the active lengths flat against the form for minimized airgap thickness and maximum winding density. When using stranded or Litz wire, the windings of multiple phases can be made to occupy 100% of the circumference in the active length area by applying pressure. In one embodiment of the invention, the winding density can be maximized for highest efficiency and power capability by utilizing holding features with a conductor space width, W. The rotor of the electrical machine has a number n of same polarity poles. The armature has a number of phases, N, of multiple phase windings, and the airgap armature has a minimum diameter, d, of the active length of the multiple phase windings. The relationship of these parameters in this embodiment is expressed as follows: $W = (\pi d)/(2 n N)$.

The form can have a planar cross-section or alternatively can be non planar. Examples of non planar cross-section include but are not limited to 'L' or 'Z' shapes. They can provide increased structural rigidity and also facilitate easier installation in some configurations of electrical machines.

One layer of multiple phase windings can be wound on the form or alternatively multiple phases can be wound to provide increased windings with a larger armature airgap. One preferable method for winding multiple layers on a single form is to wind the first layer with a shorter active length than subsequent layers. Multiple layer armatures can also be constructed by using multiple forms in a single magnetic airgap. In this case, the sides of two forms having the active lengths are preferably arranged to be facing each other. This minimizes the required airgap thickness and can increase structural integrity as well as damage tolerance since the active regions are shielded by the forms.

The invention can be utilized in any electrical machines employing airgap armatures such as motors, generators, alternators, hybrid vehicle drives, etc. It is particularly well suited for use in flywheel energy storage systems especially because of the capability for higher efficiency, low inductance, increased structural integrity and rigidity, maximized winding density per airgap thickness and lower cost improved manufacturability.

DESCRIPTION OF THE DRAWINGS

The invention and its many attendant benefits and advantages will become better understood upon reading the following description of the preferred embodiments in conjunction with the following drawings, wherein.

DESCRIPTION OF THE PREFERRED EMBODIMENT

Figure 1:
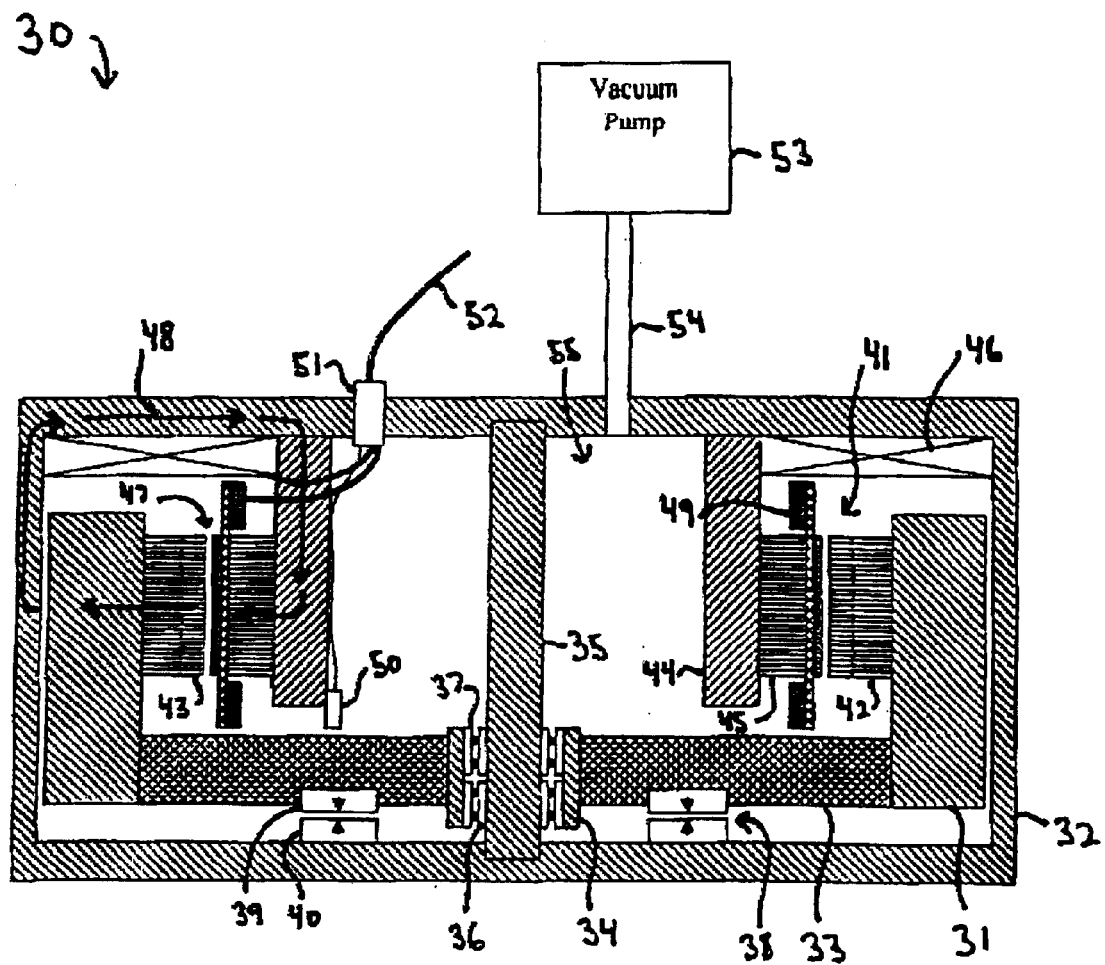
FIG. 1 is a schematic drawing of a flywheel energy storage system with airgap armature in accordance with the invention.

Turning to the drawings, wherein like reference characters designate identical or corresponding parts, a flywheel energy storage system 30, shown in FIG. 1, incorporates an electrical machine 41 using an airgap armature 49. The flywheel system 30 has a rotor including a rim 31 and a hub 33 mounted for rotation relative to a stator. The rim is preferably a cylindrical steel flywheel rim 31 that rotates to store energy in the form of rotational inertia inside a sealed container 32. The hub 33 connects the rim 31 to a center tube 34, which is journalled about a stationary center shaft 35 by upper and lower mechanical bearings 37, 36. A magnetic bearing 38, comprised of opposed rings of rotor magnets 39 and stator magnets 40 in repulsion, lifts a portion of the weight of the flywheel 31 to minimize the load on the bearings 37 and 36. Other bearing systems could also be used as are known in the art.

Figure 7A:
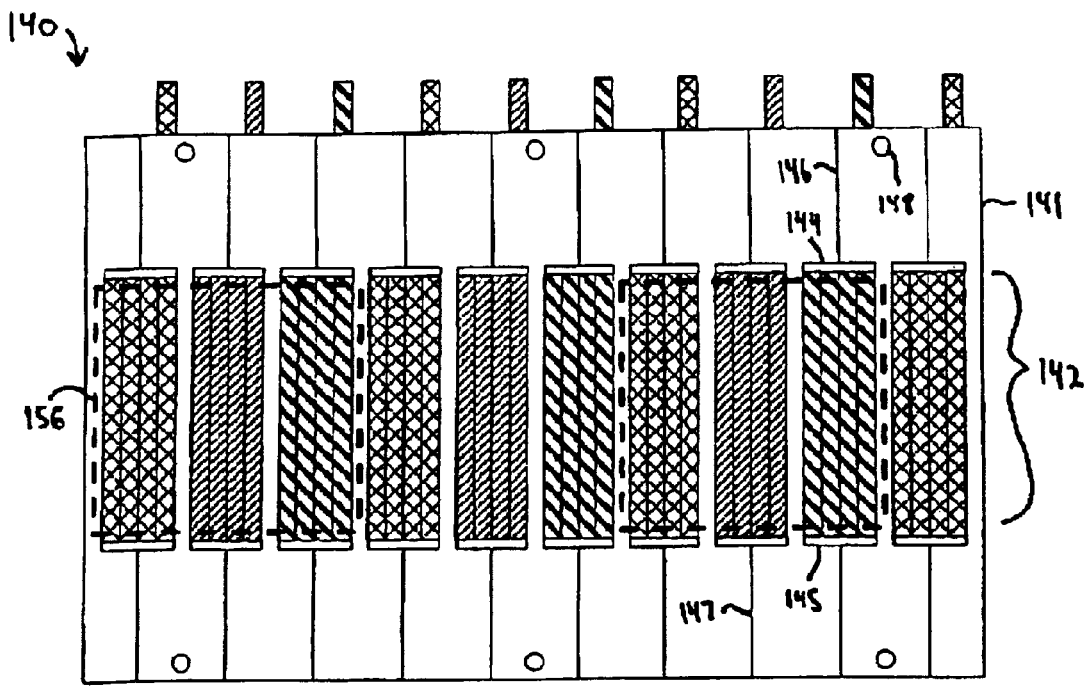
FIG. 7A is a schematic drawing of a fifth alternate configuration airgap armature in accordance with the invention.

The flywheel 31 is accelerated and decelerated for storing and retrieving energy by an integral electrical machine 41 in accordance with the invention. A laminated steel rotor ring 42 having internal circumferentially spaced, radially extending protrusions 43 or teeth is interference fit in to the bore of the rim 31. The width and spacing of the protrusions 43 is indicated in FIG. 7A, where they are shown in phantom as item 156. Radially inside the rotor ring 42 is a laminated stator ring 45 that is attached to a cylindrical steel support yoke 44. An annular field coil 46, concentric with the axis of rotation of the rim 31, generates a field flux that travels in a flux path 48 across the armature air gap 47 bounded by the inner peripheral surface of the rotor ring 42 and outer peripheral surface of the stator ring 45. The magnetic flux in the flux path 48 is concentrated or focused in radial rays by the teeth 43, resulting in a flux field that strongly varies in intensity across the airgap 47 as the rotor rotates. An airgap armature 49 having multiple phase windings is located in the armature airgap 47 for receiving the circumferentially varying flux as the rotor 31 rotates, and inducing alternating current in its windings. The armature 49 operates as a motor by applying synchronous AC power to its windings to accelerate the flywheel 31. Rotational position sensors 50 can be used for synchronization. Wires 52 exit the sealed container 32 through a feedthrough 51. A chamber 55 inside of the container 32 is maintained with a vacuum by an external vacuum connection 54 to a vacuum pump 53 to reduce aerodynamic drag loss.

Figure 2A:
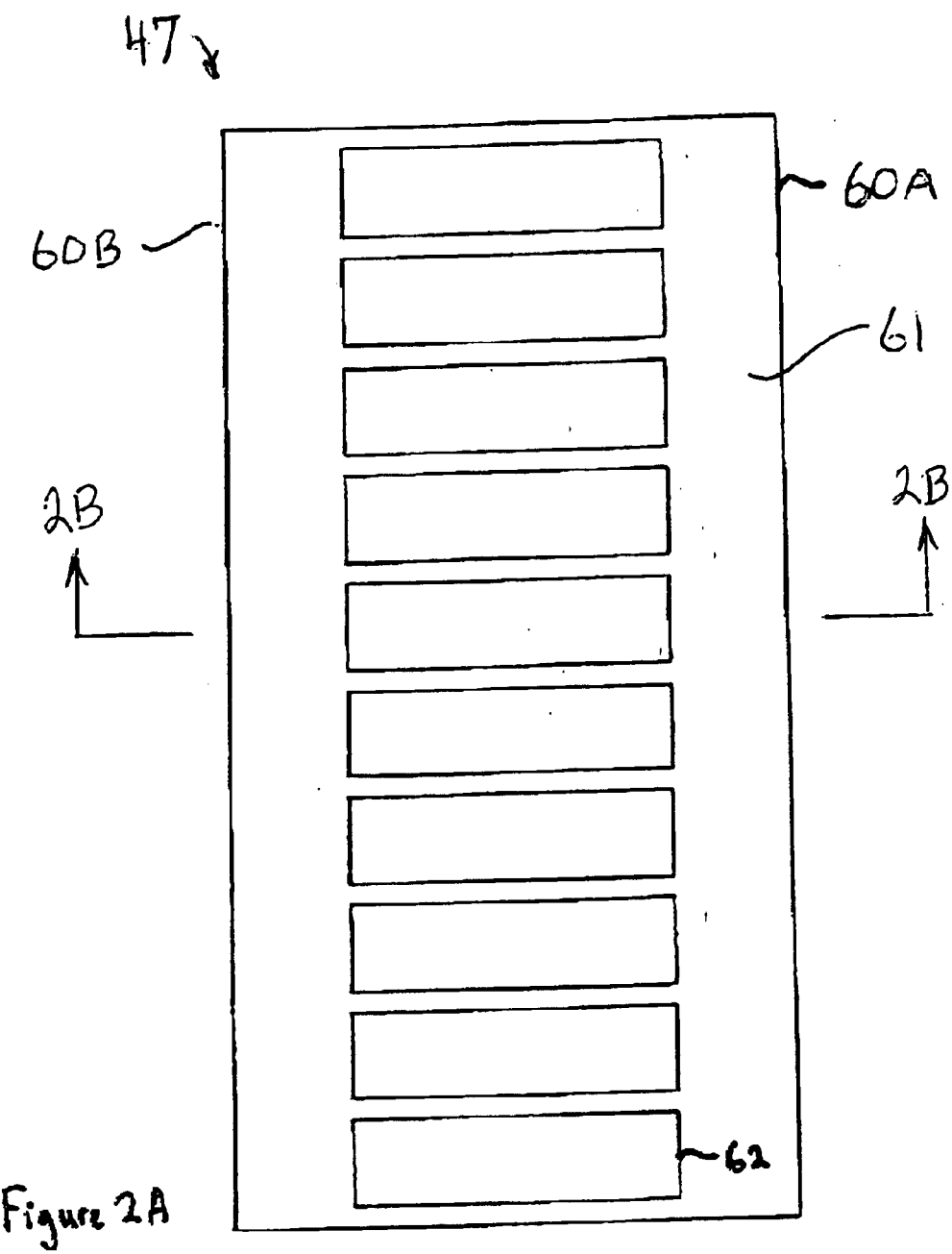
FIG. 2A is a schematic developed drawing of an airgap armature in accordance with the invention.
Figure 2B:
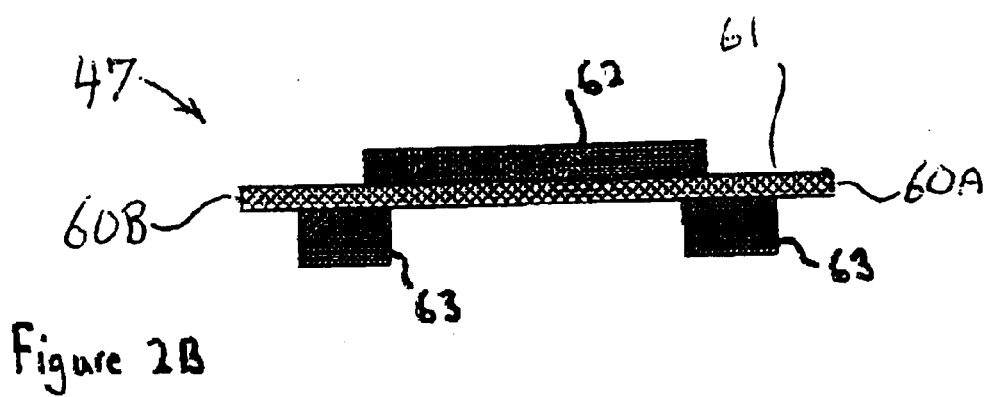
FIG. 2B is a sectional elevation along lines 2B—2B FIG. 2A.

In FIGS. 2A and 2B, the airgap armature 47 is shown circumferentially laid out flat, for clarity of illustration. The airgap armature 47 is constructed of multiple phase windings 62, 63, comprised of wires that are wound onto and bonded to a substantially nonmagnetic and electrically nonconductive form 61. The form 61 has two ends 60A and 60B, each with features (not shown in FIGS. 2A and 2B) for holding end turns 63 of the multiple phase windings 62, 63. The multiple phase windings 62, 63 comprise both active lengths 62 and end turns 63, wherein active lengths 62 are located on one side of the form 61 and the end turns 63 are located on the opposite side of the form 61. This arrangement provides numerous benefits, including the capability to maximize the winding density in the active length area for maximum power capability and efficiency. Active lengths of different phases can all be easily laid down flat against the form for a thin airgap distance. Overlapping at the end turns does not cause the active lengths to be disturbed or pulled away from the form because the end turns lie on the opposite side of the form. The construction also provides for easier and lower cost manufacturing as well as increased structural integrity and rigidity. Coils or windings are wound directly on the form and there is no need for multiple steps and the difficult handling and assembling of prewound isolated coils. After winding the windings are preferably bonded to each other and to the form to make a strong and stiff structure.

The form is preferably constructed from substantially nonferromagnetic and electrically nonconducting form material to reduce or eliminate eddy current and hysteresis losses in the form. One preferred form material is fiberglass laminate, which is commercially available under the trade name G10. Such laminate form material is available already cured in laminates of various thicknesses and can be used to constructed the form. Preferably, the form material for cylindrical armatures, such as the armature 47 shown in FIG. 1, is made from tubular material that is simply cut to the desired length to yield a tubular cylindrical blank which can be machined as desired for winding on the coils/windings. The form is preferably made thin walled to minimize the required airgap thickness. Typical thickness range from about $1/32$ inch to $1/8^{th}$ inch or greater if extra torsional rigidity and strength are required and the airgap thickness can be tolerated. Other form materials can also be utilized such as plastic that can be molded to shape, etc. Wide shallow grooves may be cut in the form 61 to receive the active lengths 62, and bonding the active lengths in the grooves with a strong bonding material such as epoxy compensates for the reduction in stiffness of the form 61 caused by cutting the grooves, while minimizing the cross-sectional thickness of the armature 47. A thermally conductive bonding epoxy facilitates heat conduction from the armature 47 to the inner ring 45 to ensure that the armature does not overheat during high-power operation.

Figure 3A:
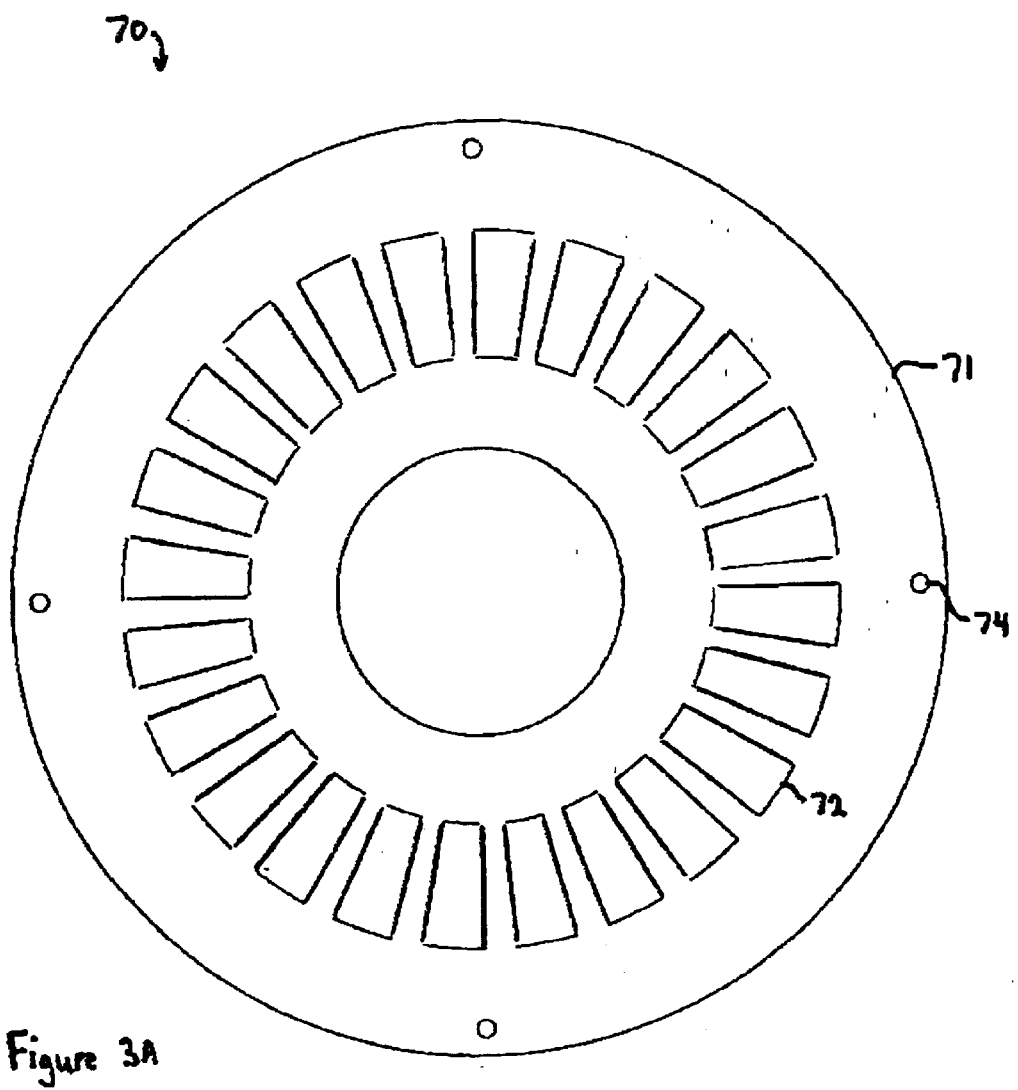
FIG. 3A is a schematic drawing of an alternate configuration airgap armature in accordance with the invention.
Figure 3B:
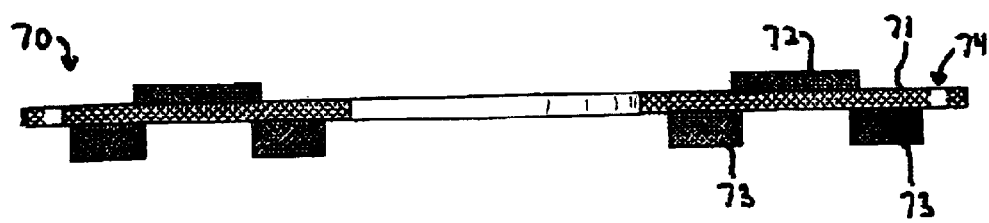
FIG. 3B is a schematic drawing of an alternate configuration airgap armature in accordance with the invention.
Figure 8:
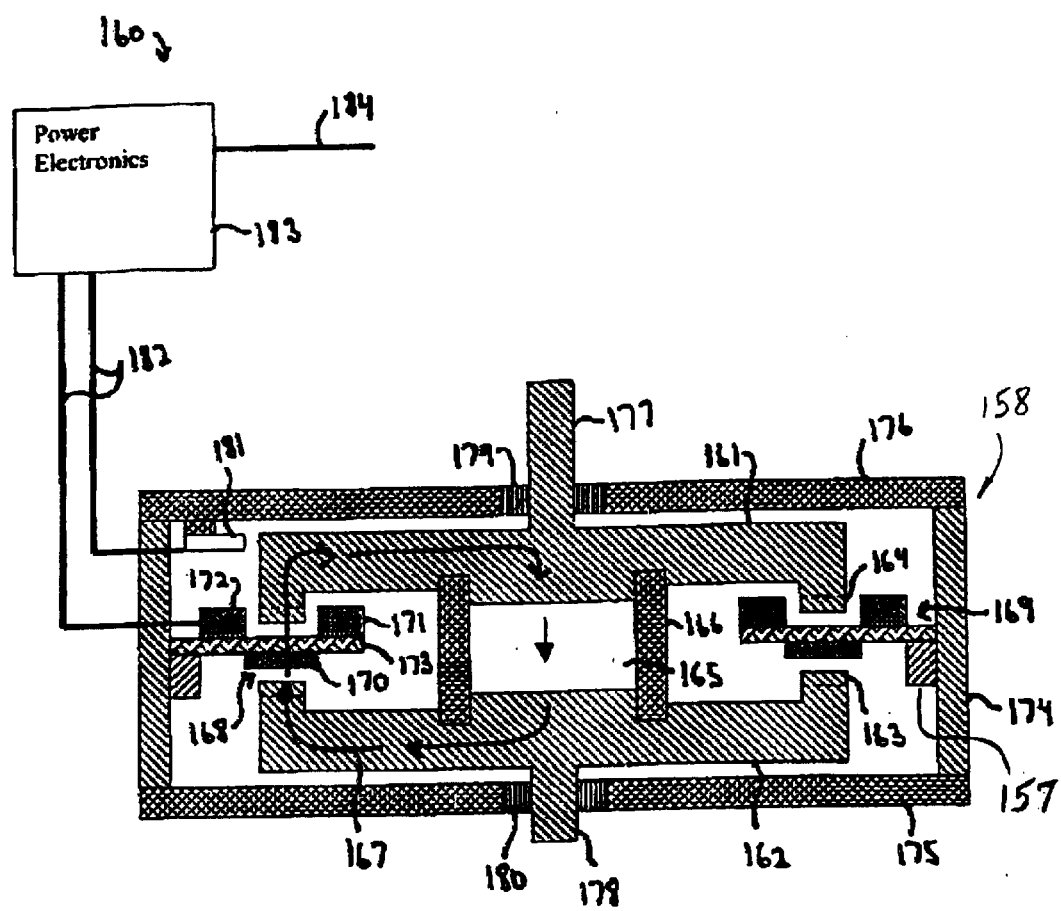
FIG. 8 is a schematic drawing of a permanent magnetic electrical machine with airgap armature in accordance with the invention.

Another configuration airgap armature 70, shown in FIGS. 3A and 3B, is useful in axial airgap machines, one example of which is shown in FIG. 8 and described in detail below. The airgap armature 70 is comprised of a form 71 that is wound with windings having active lengths 72 on one side and end turns 73 on the opposite side of the form 71. The form 71 in this case can simply be constructed of a flat sheet of form material, described above, and mounting holes 74 can be provided to mount the airgap armature 71 in an electrical machine.

Figure 4A:
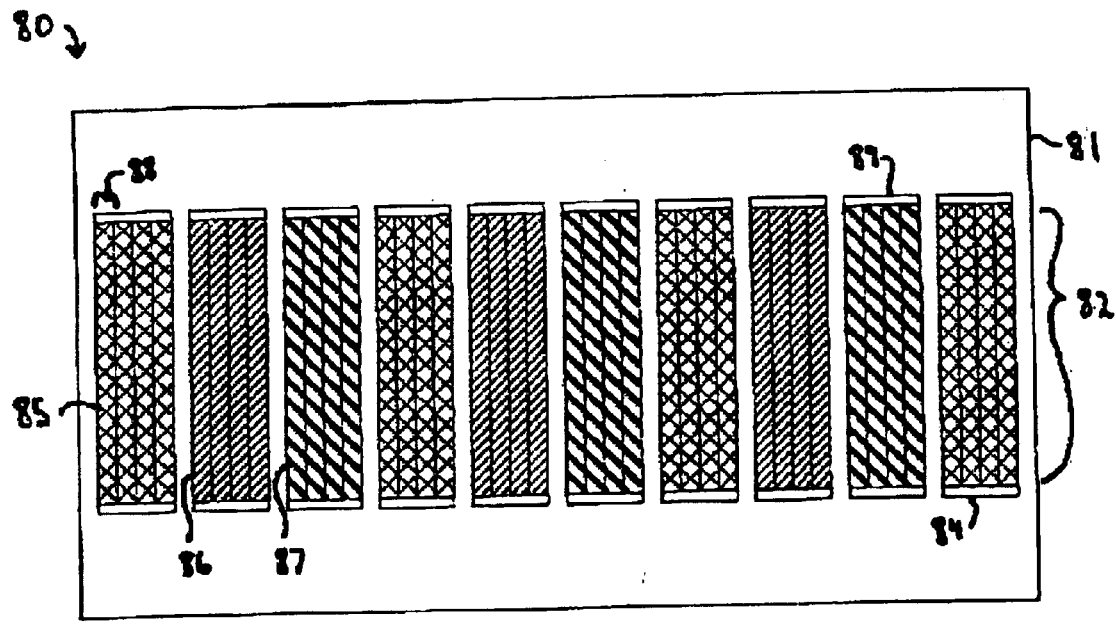
FIG. 4A is a developed schematic elevation of a cylindrical airgap armature in accordance with the invention, shown opened up or unrolled for clarity of illustration.
Figure 4B:
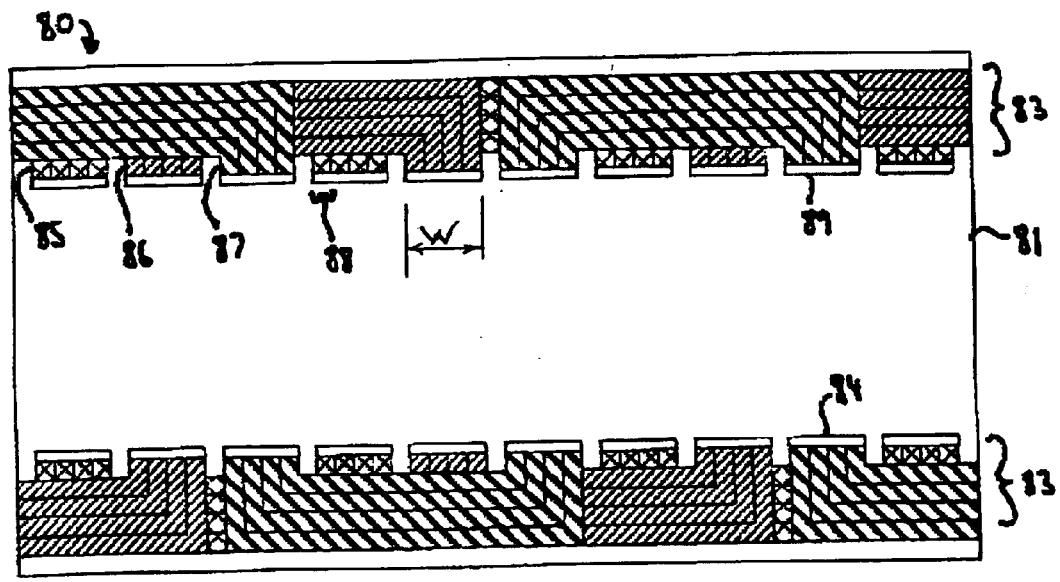
FIG. 4B is a developed schematic elevation of the opposite side of the airgap armature shown in FIG. 4A.

As shown in FIGS. 4A and 4B, another airgap armature 80 includes a form 81 onto which multiple phase windings 85, 86, 87 are wound. The windings 85 preferably consist of multiple conductors 88 for ease of winding, complete fill of windings and reduced eddy currents in the windings. The windings 85, 86, 87 consist of active lengths 82 and end turns 83. Features 84, 89 exist on each end of the form 81 to hold the end turns. In this case the features 84, 89 comprise through-holes or slots. The multiple phase windings 85, 86, 87 (three-phase windings as illustrated) pass through the through the slots 84, 89 while traversing between said active lengths 82 and the end turns 83. Preferably, only one phase passes through a single through slot 84, 89 to facilitate winding. As shown, the windings comprise serpentine paths of the wires 88, with wires of each phase jumping two slots in the end turn before re-traversing the form 81 as another active length, so that every fourth active length is part of a single serpentine coil. The use of serpentine paths facilitates easier winding, and increases the structural rigidity of the airgap armature 80 when the end turns 83 are bonded together and to the form. It can also reduce the inductance of the windings for higher power capability and faster current rise times. The bonding process can be done with numerous methods including those commonly used in motor winding construction. One such method is vacuum injection. A mold or vacuum bag can be used to compress the windings and form an accurate shape, and a bonding material, such as epoxy, is injected into the vacuum bag, either before or while the vacuum is being pulled. If the windings are wound using Litz wires or multiple strand wire for lower losses, the compression during bonding can squeeze the active lengths of different phases into abutting position for complete fill and minimized airgap thickness. The bonding causes the structure to become rigid with increased strength, improves heat transfer and prevents potential moisture penetration. As shown the serpentine windings are wound one complete phase at a time. However, other winding methods can be utilized as will be discussed.

To achieve maximum active length winding density, the features, such as the slots 84, 89, for holding the end turns of the multiple phase windings have a circumferential width, W. The rotor has a number of same polarity poles, n. The airgap armature has a number of phases, N, of multiple phase windings and the airgap armature has a minimum diameter, d, of the active length of the multiple phase windings. W can preferably be made approximately equal to $(\pi d)/(2 n N)$.

Figure 5C:
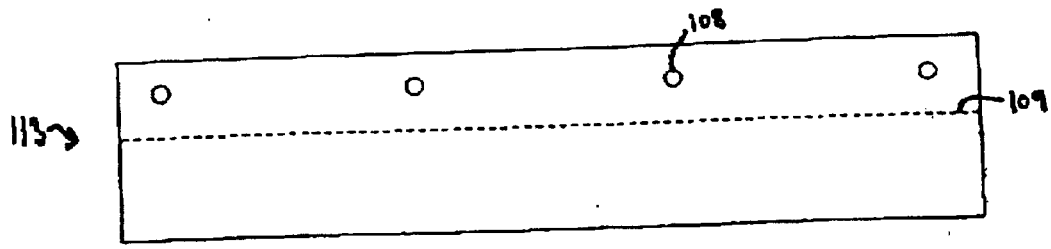
FIG. 5C is a schematic drawing of a mounting form for attachment to the winding form 100 shown in FIGS. 5A and 5B.
Figure 5A:
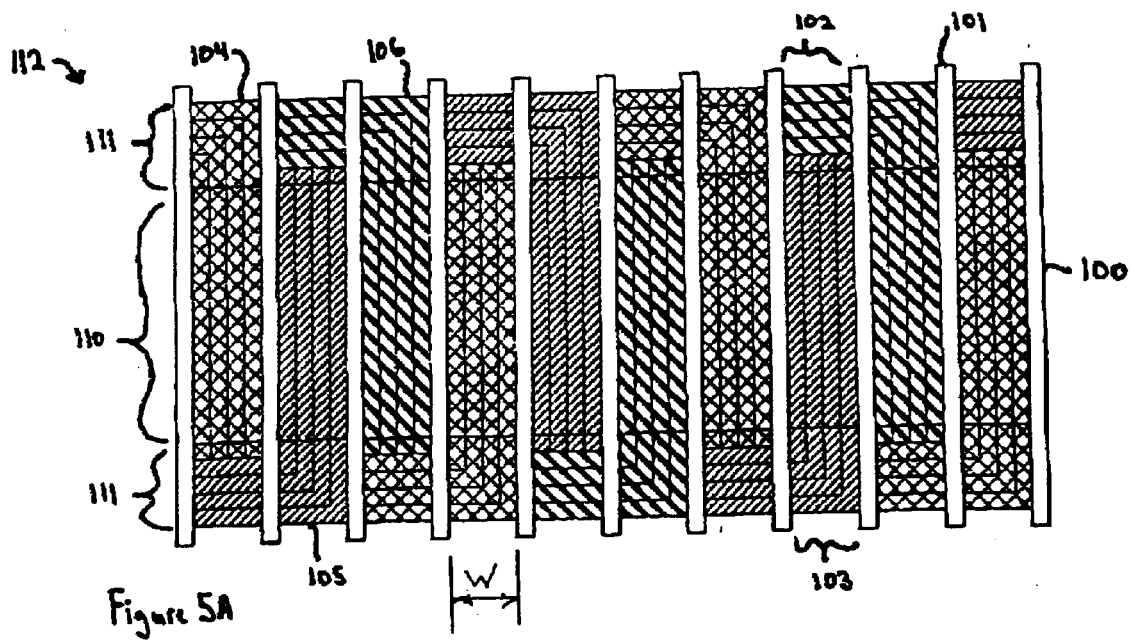
FIG. 5A is a schematic drawing of a third alternate configuration airgap armature in accordance with the invention.
Figure 5B:
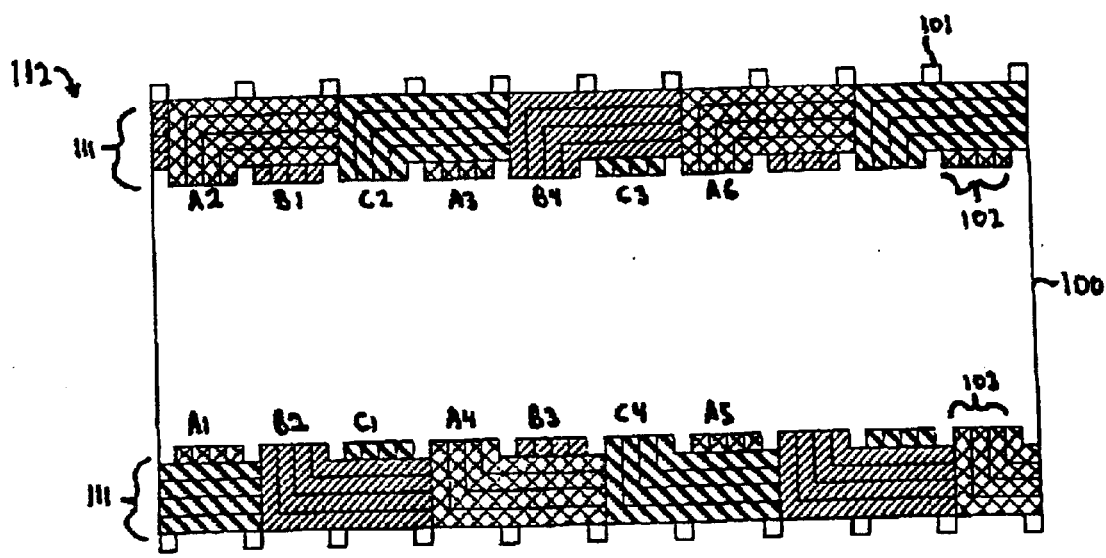
FIG. 5B is a schematic drawing of a third alternate configuration airgap armature in accordance with the invention.

Another configuration airgap armature in accordance with the invention is shown in FIGS. 5A, 5B and 5C. The airgap armature 112 is comprised of a form 100 that has end features in the form of spaces 103 between pegs 101 for the windings 104, 105, 106. The windings 104, 105, 106 have active lengths 110 and end turns 111 where the active lengths 110 are on one side of the form 100 and the end turns 111 are on the other side.

The multiple phase windings 104, 105, 106 pass between pegs 101 while traversing between active lengths 110 and end turns 111. Preferably, only one phase of said multiple phase windings passes between two circumferentially adjacent pegs. After winding, a mounting form 113, shown in FIG. 5C, also preferably constructed of nonmagnetic and electrically nonconducting material, can be bonded to the form 100, preferably during bonding of the wires in the windings 104, 105 and 106 to the form 100 over the end turns 111, to provide for mounting. The mounting form 113 can have mounting holes 108 and is preferably bonded to the form 100 at a position 109 so as to not overlap the active length 110.

Easier winding can further be facilitated in forms that have open ends such as with pegs 101 or other constructions by using a specific winding process. The winding process winds serpentine windings to the form 100 in a manner to prevent the need for threading any windings through holes created by prior windings and the form 100. To accomplish this, the multiple phase windings 104, 105, 106 are wound on to the form 100 simultaneously by placement of the phase active lengths of different phases in succession around the circumference of the airgap armature 112 wherein the windings placed in end features alternate phases and the winding direction between end features also alternates. For example, this winding process wraps windings in the spaces between pegs according to the following order as illustrated: A1, A2, B1, B2, C1, C2, A3, A4, B3, B4, C3, C4, A5, A6, etc. The winding can be done by hand or can be automated.

Figure 6:
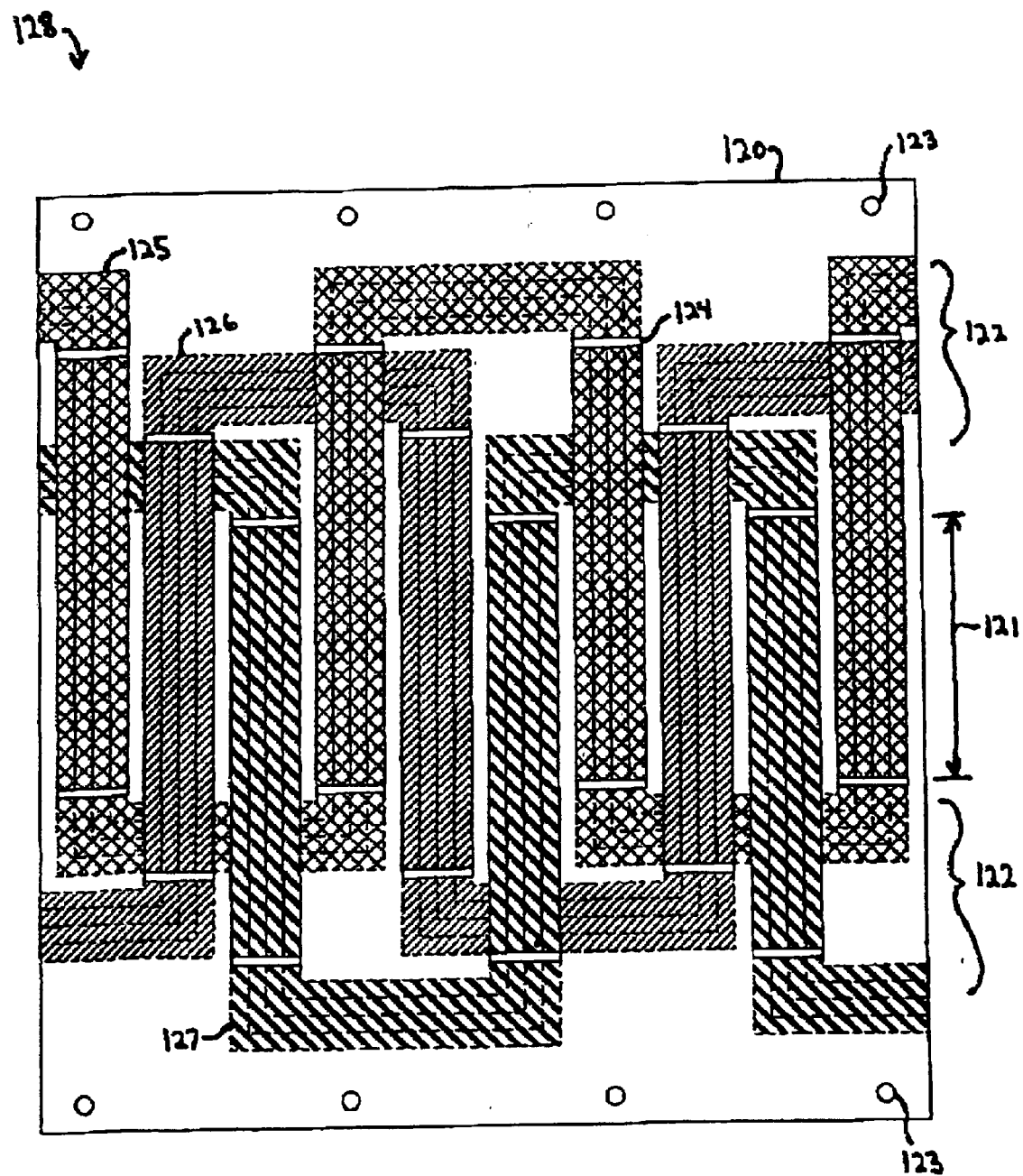
FIG. 6 is a schematic drawing of a fourth alternate configuration airgap armature in accordance with the invention.

Another configuration airgap armature 128, shown in FIG. 6, is useful in applications in which it is desirable to minimize the thickness of the end turns as well as the active lengths. The armature 128 has multiple phase windings 125, 126, 127 wound on to a form 120. The windings 124, 125, 126 comprise active lengths 121 and end turns 122. To prevent overlapping of the end turns 122 of different phases, they are each offset. The end turns 122 then each lie flat against the form 120. One drawback of this configuration is that the windings 125, 126, 127 are necessarily longer for a given active length 121, increasing the resistance and losses.

The winding is shown using through slots 124 that are offset to facilitate the offset pattern. Mounting holes 123 can be included for mounting if desired.

Figure 7B:
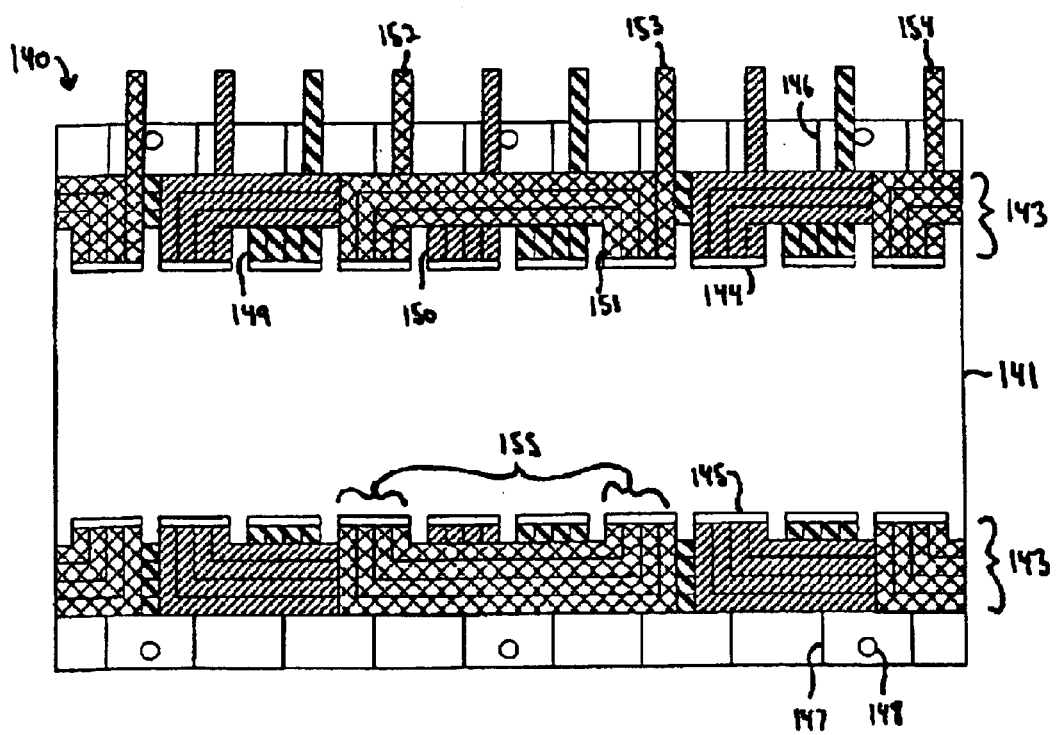
FIG. 7B is a schematic drawing of a fifth alternate configuration airgap armature in accordance with the invention.

Another configuration airgap armature 140, shown in FIGS. 7A and 7B, uses windings that form annular coils, instead of the serpentine windings shown in FIGS. 4A and B, 5A and B, and 6. The airgap armature 140 is constructed of a form 141 and multiple phase armature windings 149, 150, 151 that are wound such that the active lengths 142 lie on one side of the form 141 and the end turns 143 lie on the other side. The windings 149, 150, 151 comprise coils 155 that are wound on to the form 141. Each winding coil 155 has a starting end 152 and an ending end 153. Multiple coils of a single phase can be connected together in series or parallel as with multiple conductors of serpentine wound windings. For serial connection, the ending end 153 of one coil 155 can be connected to the starting end 154 of the next coil of the same phase. Alternatively, the coils of a given phase can be wound together sequentially around the diameter to reduce the required electrical connections. The form 141 shows yet another construction for end features to hold the windings. The form comprises opposed holes or slots 144, 145 to hold the end turns 143. However, to facilitate easier winding, slits 146, 147 are provided for sliding insertion of the winding wires. Such a construction allows simultaneous placement of mounting holes 148 on the form 141. After bonding, the airgap armature becomes rigid.

The width and spacing of protrusions which focus the magnetic flux through the armature, such as the protrusions 43 in a machine like the machine shown in FIG. 1, is indicated by phantom lines 156. As shown the protrusions are as wide as the three phases in a three-phase machine, and are spaced apart by the same width. The protrusions are tall enough to extend the full length of the active lengths 142 to maximize the amount of flux through the active lengths 142.

A magnetic electrical machine 160 with an airgap armature 169, shown in FIG. 8, is constructed with two ferromagnetic rotor pieces 161, 162 having multiple circumferentially spaced protrusions 163, 164 facing an armature airgap 168. The airgap armature 169 is built on a flat annular form 173, like the armature shown in FIGS. 3A and 3B, having active lengths 170 on one side of the form 173, and end turns 171, 172 located on the opposite side of the form 173. It has provisions for attachment to a support at its outer periphery, by which it is attached to a support 157 on a fixed member such as the machine housing 158, and extends radially inward into the armature airgap 168. A permanent magnet 165 drives magnetic flux through a flux path 167, which includes the two ferromagnetic rotor pieces 161, 162 and the airgap 168, and through the airgap armature 169 in the airgap 168. The protrusions 163, 164 concentrate the magnetic flux in the flux path 167 into an array of axial rays which rotate with the two ferromagnetic rotor pieces 161, 162, thereby inducing alternating current in the armature windings as the rotor 161, 162 rotates. A nonmagnetic tube 166 connects the rotor halves 161, 162 and reinforces the magnet 165. The rotor 161, 162 is supported for rotation by shafts 177, 178 that rotate in mechanical bearings 179, 180 mounted to housing end plates 175, 176. The end plates 175, 176 are connected by an outer tube 174. A rotary position sensor 181 can be provided for synchronizing the windings of the armature 169 for operation as a motor, and wires 182 are connected to external power electronics 183 and external power connection 184. In this case, the airgap armature 169 is enclosed on both sides by the rotating rotor 161, 162. The airgap armature must be structurally rigid and sufficiently strong to transfer the torque. One benefit of this construction is the elimination of the need for laminations and the losses and added costs that they produce because the flux through the two ferromagnetic rotor pieces 161, 162 remains substantially constant during operation.

Figure 9:
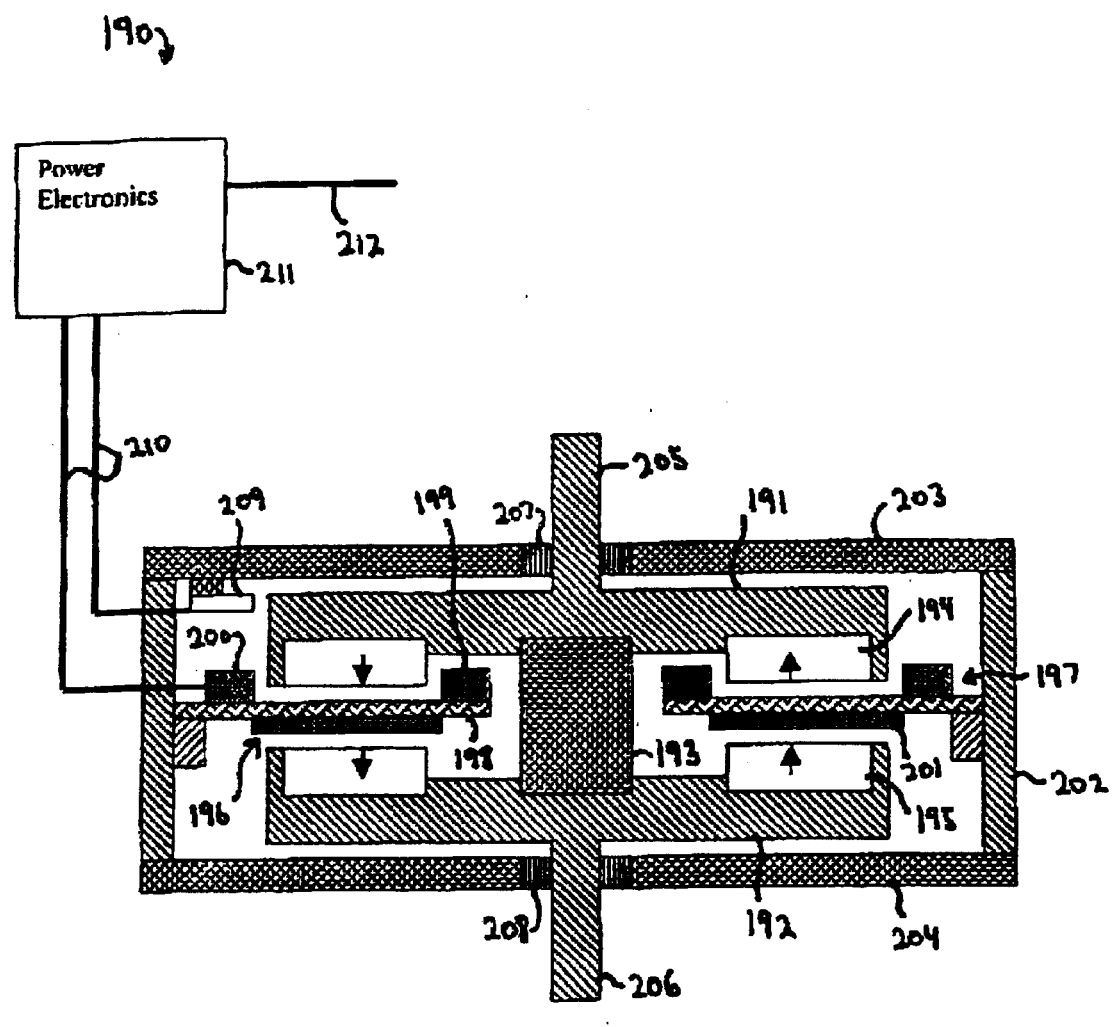
FIG. 9 is a schematic drawing of an alternate configuration permanent magnetic electrical machine with airgap armature in accordance with the invention.

Another configuration permanent magnetic electrical machine with airgap armature in accordance with the invention is shown in FIG. 9. The electrical machine 190 is comprised of two ferromagnetic rotor portions 191 and 192 that are separated by a connection cylinder 193. Circumferentially alternating polarity axially magnetized magnets 194, 195 are attached to either one or both rotor portions 191, 192 to drive flux across an armature airgap 196 formed therebetween. An airgap armature 197 is inserted in the armature airgap 196 for inducing alternating current in its windings as the rotor 191, 192 rotates. The airgap armature 197 comprises active lengths 201 and end turns 199, 200 located on opposite sides of the form 198. The benefit of the alternating permanent magnet polarities is increase voltage generation in the airgap armature for a given speed and flux density because the flux change is double what it would be for a homopolar machine. The drawback is however increased costs and rotor stresses. Like FIG. 8, the rotor 191, 192 is supported by shafts 205, 206 that rotate in mechanical bearings 207, 208, attached to housing end plates 203, 204, and the end plates 203, 204 are connected by an outer tube 202. A position sensor 209 can be used for feedback in motor operation if desired. Wires 210 are connected to external power electronics 211 and a power connection 211.

Figure 10A:
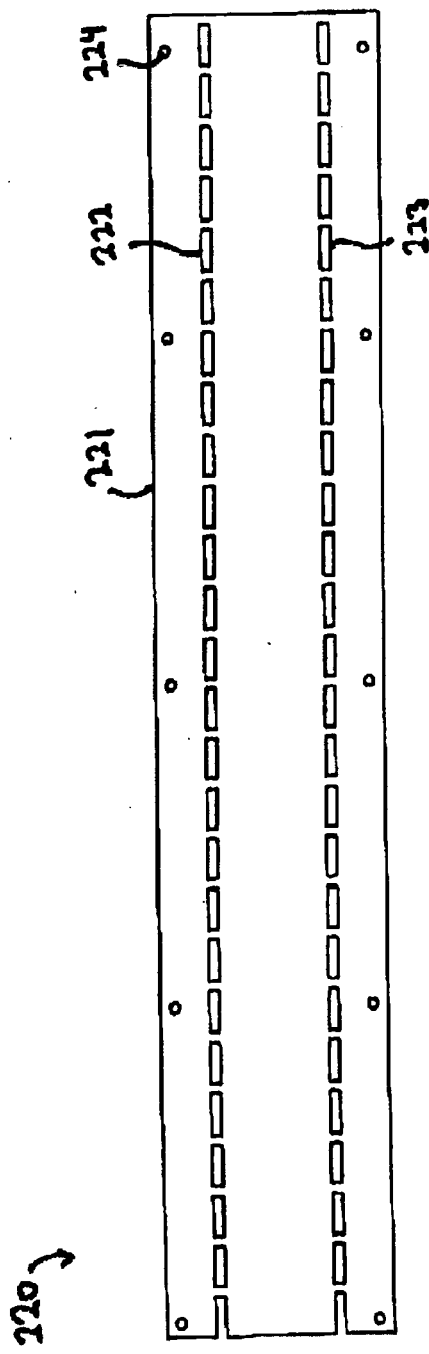
FIG. 10A is a schematic drawing of a sixth alternate configuration airgap armature in accordance with the invention.
Figure 10B:
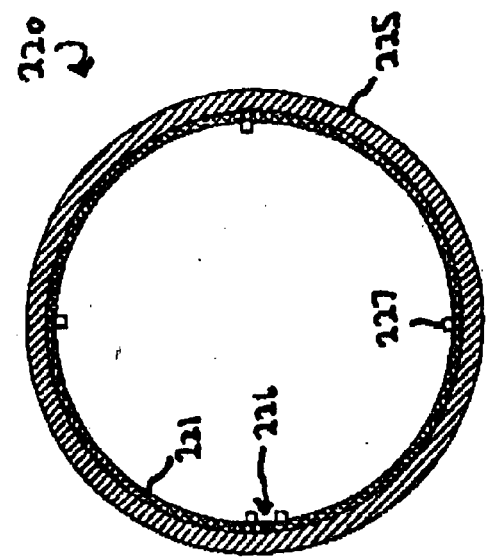
FIG. 10B is a schematic drawing of a sixth alternate configuration airgap armature in accordance with the invention.

Another configuration airgap armature 220, shown in FIGS. 10A and 10B is a tubular construction for radial gap electrical machines. To facilitate easier and lower cost construction, a tube form can be fabricated flat and then rolled in to a circular shape, or the form may be procured already made as a tube, which can be cut to the desired length. The form 221 of an airgap armature 220 is shown as a flat thin sheet. The form 221 is preferably machine or waterjet cut with the features 222 to hold the end turns along with mounting holes 224 while being substantially flat. The form 221 is then rolled in to a circular shape and attached to one or more ring structures 225 to hold the form in an accurate cylindrical shape. Rivets 227, screws or other means can be used to hold the form to the rings 225. The rings 225 are preferably located outside of the magnetic airgap or active length area to minimize the required airgap thickness. The winding on to the form 221 can be done after already in a cylindrical shape or alternatively while still flat.

Figure 11:
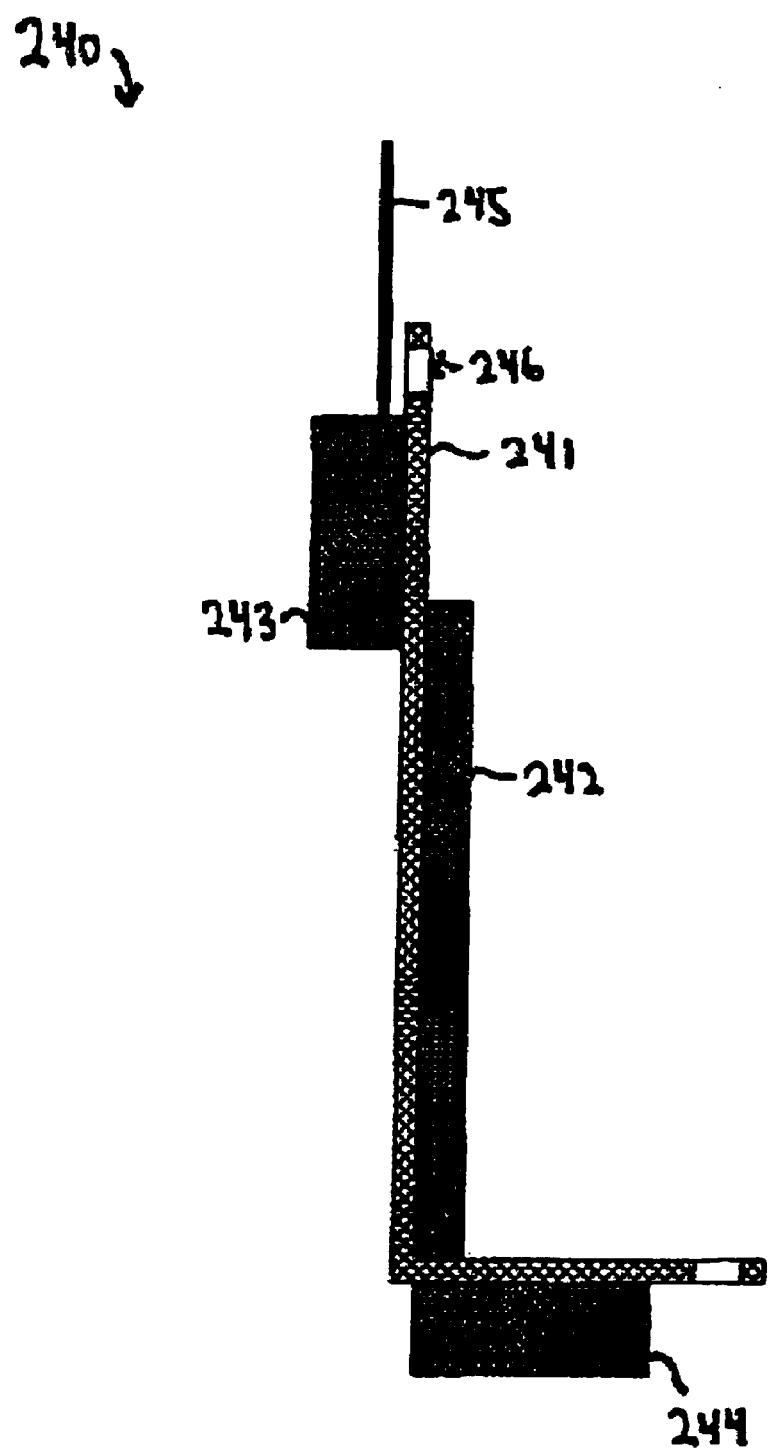
FIG. 11 is a schematic drawing of a seventh alternate configuration airgap armature in accordance with the invention.

Another configuration airgap armature 240, shown in FIG. 11, is wound on a form 241 with an L-shaped cross-section. Although shown up until now with forms having a planar cross-sections, the armature forms can have a non-planar cross-section. This can be done for several reasons, including increasing the structural rigidity and to facilitate easier installation in some types of electrical machines. The armature windings 242, 243, 244 comprise active lengths 242 located on one side of the form 241 and end turns 243, 244 located on the opposite side of the form 241. Holes 246 can be provided for mounting, and electrical connections emanate from the end turns 243. If the armature 240 is cylindrical, it can be used in an electrical machine having a radial airgap, such as the machine shown in FIG. 13, to be discussed below. An annular armature on an L-shaped form could be used on an axial airgap machine of the type shown in FIGS. 8 and 9.

Figure 12:
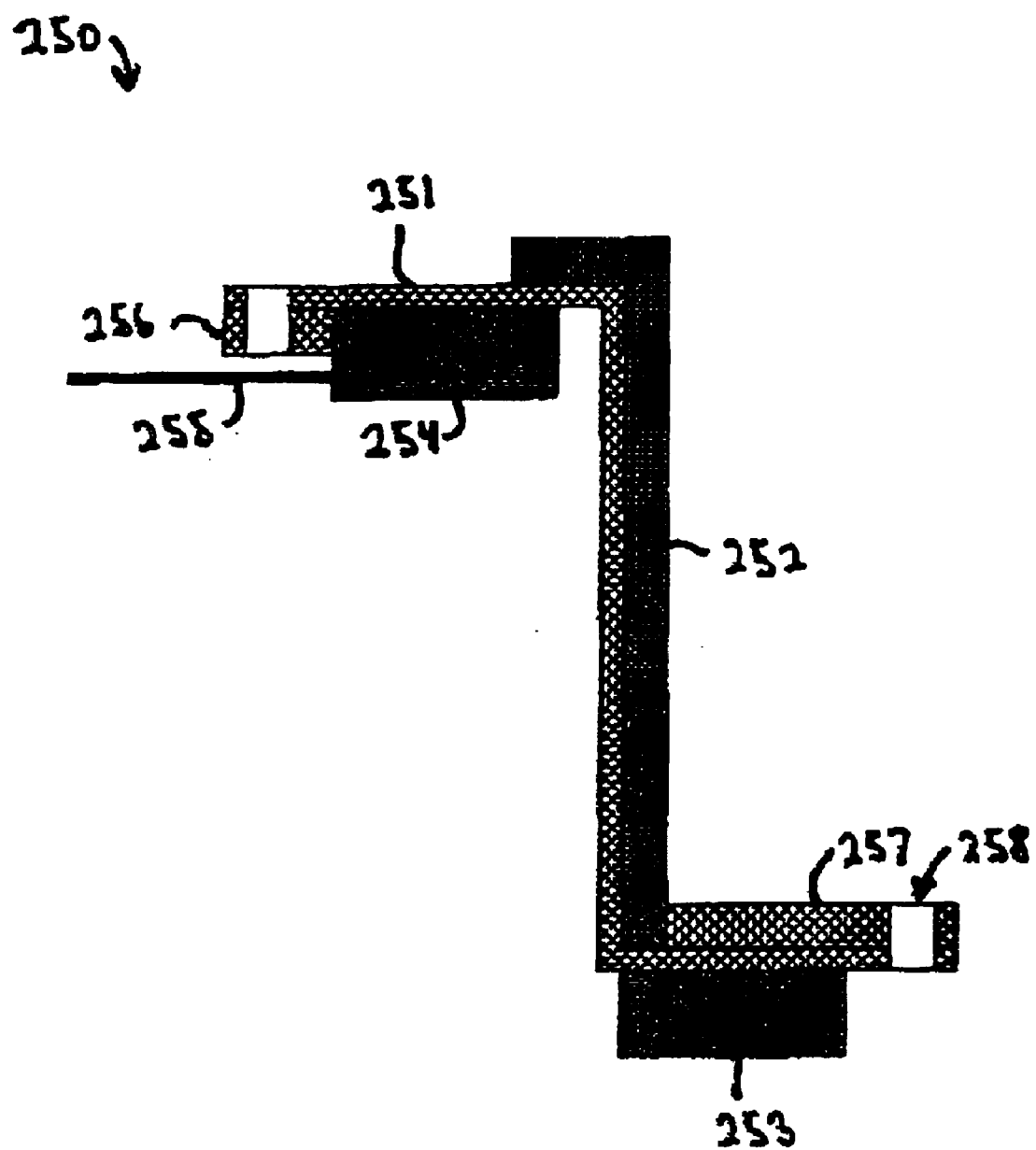
FIG. 12 is a schematic drawing of an eighth alternate configuration airgap armature in accordance with the invention.

Another configuration airgap armature 250, shown in FIG. 12, uses a different non-planar cross-section form 251 having a 'Z' cross-section. The windings 252, 253, 254 comprise active lengths 252 that are located on one side of the form 251 and end turns 253, 254 that are located on the opposite side. The active lengths thereby preferably lie down flat against the form 251. To hold the active lengths 252 flat against the form as well as to increase the rigidity and shape accuracy, a support ring 257 can be attached. A separate support ring 256 can also be used for rigidity and holes 258 can be used for mounting. The electrical connections 255 preferably emanate for one end turn 254 for each phase.

Figure 13:
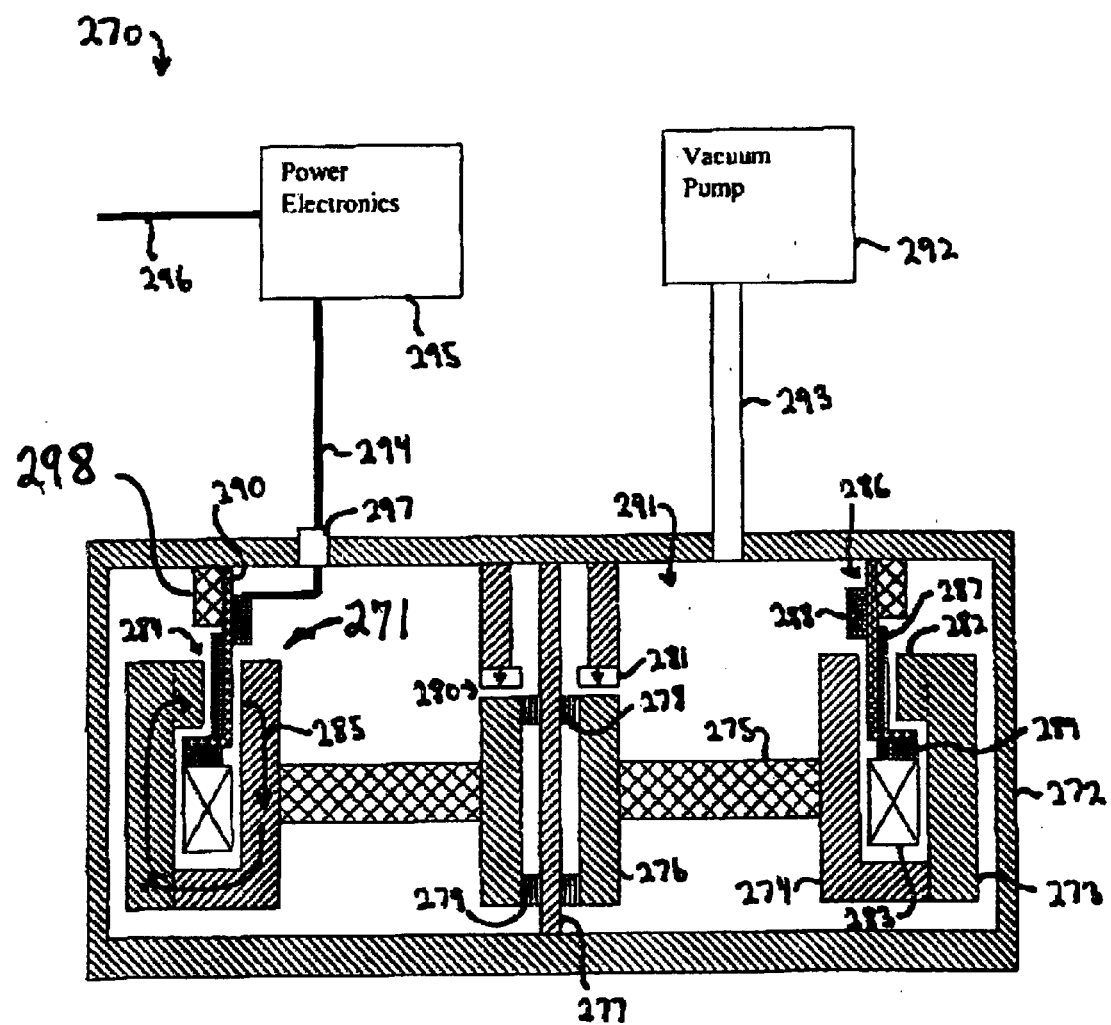
FIG. 13 is a schematic drawing of an alternate configuration flywheel energy storage system with airgap armature in accordance with the invention.

Another configuration flywheel energy storage system 270 with an airgap armature 286, shown in FIG. 13, includes a flywheel-motor/generator 271 inside a sealed container 272. The flywheel has two steel rings 273, 274 that are assembled around the aircore armature 286 and an attached field coil 283. The two rings 273, 274 are spaced apart at the top to form an axially opening radial airgap 284 for the armature 286, which is fixed to a support ring 298 attached to the housing 272 and extends into the armature airgap 284. One or both rings 273, 274 have multiple circumferentially spaced protrusions or poles 282 facing the armature airgap 284. The flywheel is attached to a center tube 276 by a hub 275, and the center tube 276 rotates about a stationary center shaft on upper and lower mechanical bearings 278, 279. A magnetic bearing 280 using a permanent ring magnet 281 lifts a portion of the weight of the flywheel 273–276. Other bearing systems could also be used.

The field coil 283 of the motor/generator 271 generates homopolar flux in a toroidal flux path 285 that includes the rings 273, 274 and the protrusions 282 which concentrate or focus the flux in an array of radial rays across the armature airgap 284. As the rotor 271 rotates, the rotating array of flux rays induce AC voltage in the airgap armature 286. The airgap armature 286 uses a cylindrical form 290 with an 'L' cross-section and has windings with active lengths 287 and end turns 288, 289 on opposite sides of the form 290. The annular field coil 283 is attached to the bottom of the airgap armature 286, further increasing the need for structural rigidity and integrity of the form 290 afforded by the L-shaped cross-section. The 'L' shaped cross-section of the form 290 allows the motor/generator to be easily assembled. The airgap armature 286 with field coil 283 is slid over the inner rim 274 and then the outer rim 273 is slid down to complete the assembly. The end turns 288, 289 do not interfere. The wires 294 for the armature windings and the field coil 283 exit the container 272 through a sealed connection 297 and connect to external power electronics 295 and a power buss 296. A chamber 291 inside the container 272 is maintained with a vacuum by a vacuum connection 293 to a vacuum pump 292. Other vacuum maintenance methods could alternatively be used such as an internal getter pump, not shown.

Figure 14:
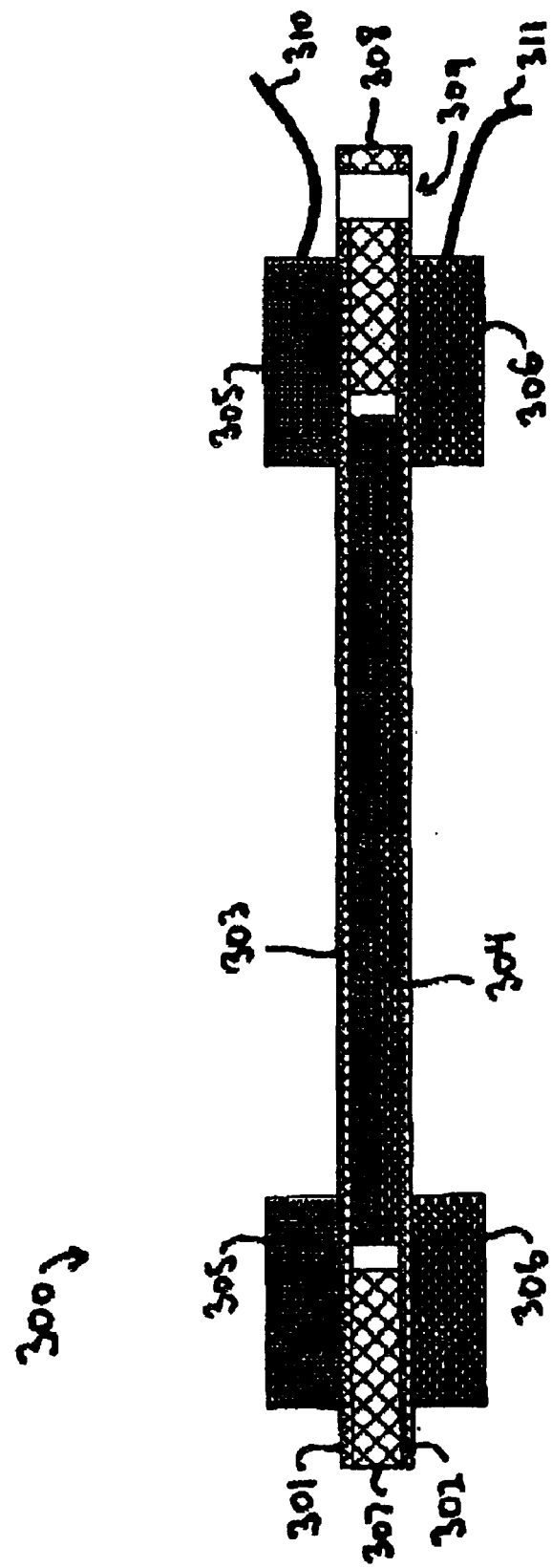
FIG. 14 is a schematic drawing of a ninth alternate configuration airgap armature in accordance with the invention

Another configuration airgap armature 300, shown in FIG. 14, utilizes multiple layers of the multiple phase windings to increase the number of windings, although it increases the airgap thickness. Applications in which armatures having multiple layers of the multiple phase windings would be desirable include those having higher power capability or increased thermal conductivity or heat capacity. The airgap armature 300 is shown in FIG. 14 having a plurality of forms 301 and 302, and windings on each form 301, 302 with active lengths 303, 304 and end turns 305, 306. The windings are preferably wound on to the forms 301, 302 and then the forms are assembled and bonded together. The forms 301, 302 are preferably assembled with the sides containing the active lengths 303, 304 each facing each other. This allows the required airgap thickness to be minimized, and can increase the structural rigidity. The configuration can also make the windings more damage tolerant by enclosing the active lengths 303, 304, that operate close to the rotor surfaces not shown, by the forms 301, 302. Spacers 307, 308 can be used for bonding or bolting the construction together and holes 309 can be provided for mounting. Wires 310, 311 can then be connected accordingly.

Figure 15:
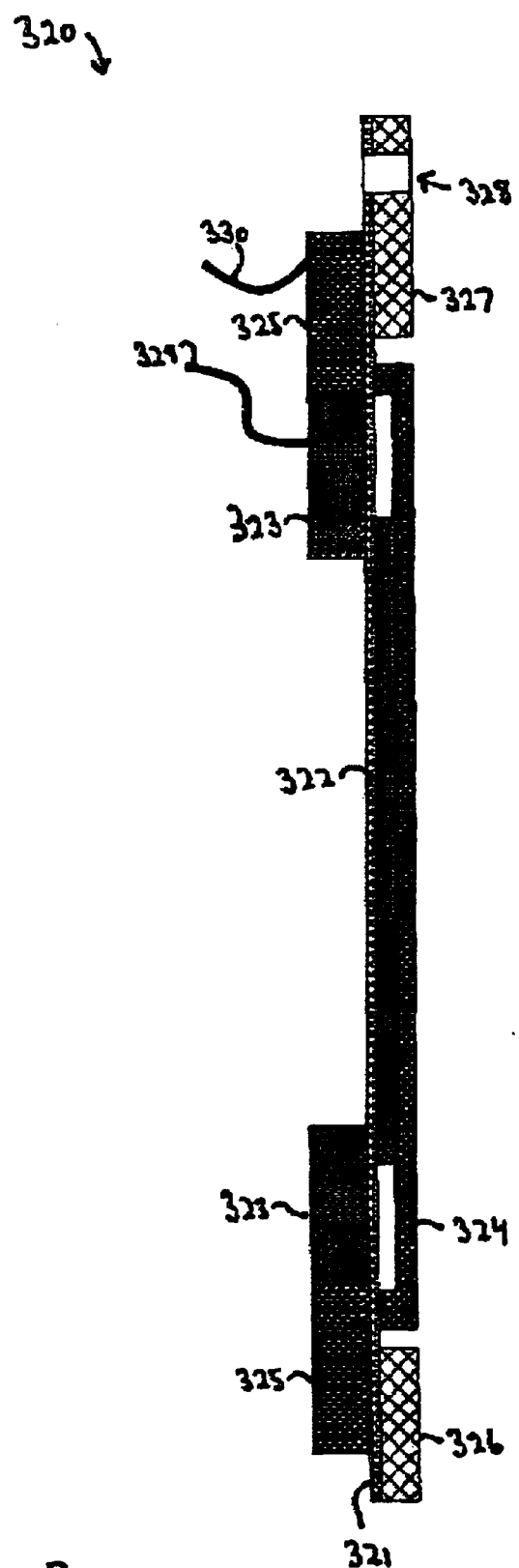
FIG. 15 is a schematic drawing of a tenth alternate configuration airgap armature in accordance with the invention.

Another configuration airgap armature 320, shown in FIG. 15, has a plurality of layers of multiple phase windings 322, 324 wound onto a single form 321. In order to wind multiple layers, the first layer 322 is preferably wound to have a shorter active length 322 than subsequent wound layers 324. The first layer 322, 323 is wound onto the form first with active length 322 on one side and end turns 323 on the opposite side. The next layer 324, 325 is then wound on top with longer active length 324 on the same side as the previous active length 322 and end turns 325 on the opposite side and adjacent but closer to the outside peripheral edge of the form 321 to minimize the thickness of the end turns 323, 325. Support rings 327, 326 can be attached for added support and for mounting using holes 328 or other means.

Figure 16:
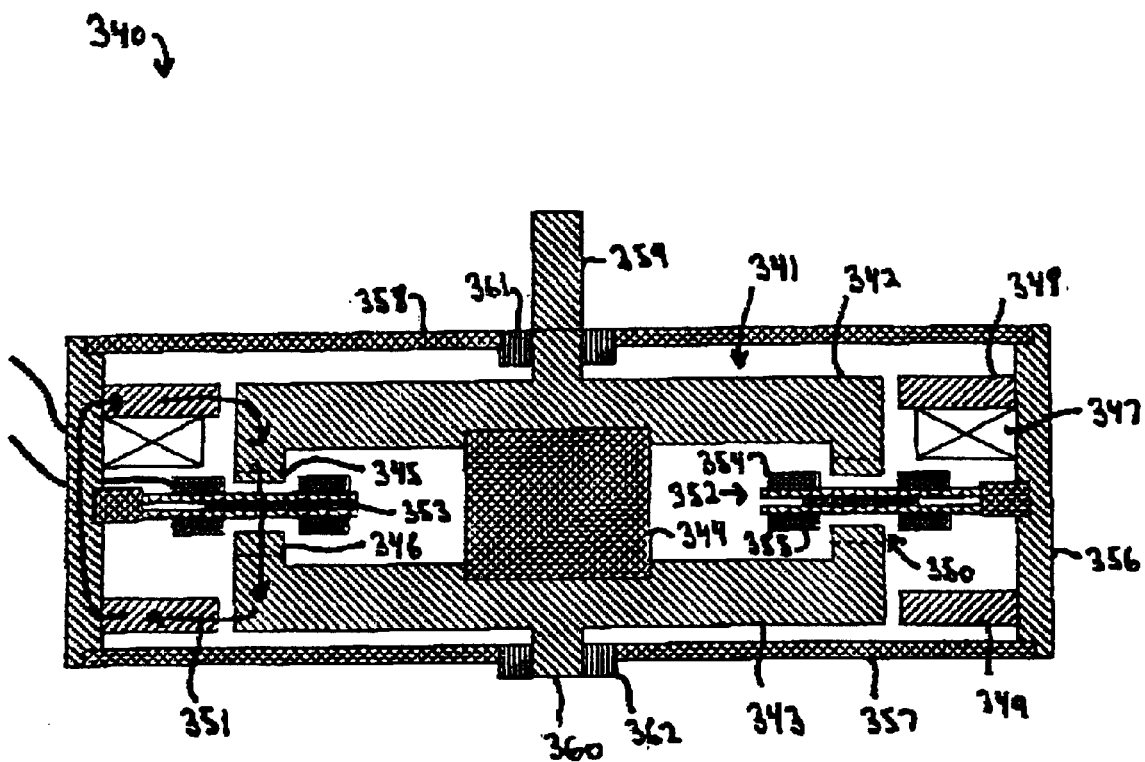
FIG. 16 is a schematic drawing of a field coil electrical machine with airgap armature in accordance with the invention.

A field coil electrical machine 340 with an annular airgap armature 352, shown in FIG. 16, has a rotor 341 having two steel rotor portions 342, 343 that are separated by a magnetic insulator 344 such as stainless steel or aluminum. One or both rotor portions 342, 343 contain multiple circumferentially spaced protrusions 345, 346 facing an armature airgap 350 formed between the tow portions 342, 343. A field coil 347 drives homopolar flux 351 through two ferromagnetic poles 348, 349 and through the rotor portions 342, 343 and armature airgap 350. As the rotor 341 rotates, alternating current is induced in the windings of the airgap armature 352 located in the armature airgap 350. The airgap armature has increased power capability by utilizing two forms having multiple phase windings in a single magnetic airgap, like the airgap armature 300 shown in FIG. 14. The sides of each form have active lengths 353 that are arranged to face each other, to minimize the required airgap thickness. The end turns 354, 355 are therefore spaced apart on the sides of the forms opposite their active lengths 353. The rotor 341 is supported by shafts 359, 360 that rotate in bearings 361, 362 attached to housing end plates 357, 358. The end plates 357, 358 are connected by an outer tube 356.

Obviously, numerous modifications and variations of the preferred embodiment described above are possible and will become apparent to those skilled in the art in light of this specification. For example, many functions and advantages are described for the preferred embodiment, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein I claim:

What is claimed is:

1. An airgap armature for a brushless rotary electrical machine for converting between electrical and mechanical energy, said airgap armature comprising:

multiple phase windings comprised of wires that are wound on to and bonded to a substantially nonmagnetic form having two ends, each with features for holding end turns of said multiple phase windings;

said multiple phase windings comprising both active lengths and end turns, wherein said active lengths are located on one side of said form and said end turns are located on the opposite side of said form.

2. An airgap armature for a brushless rotary electrical machine as described in claim 1 wherein:

said brushless rotary electrical machine comprises a rotor that rotates about an axis and a stator comprising a field coil mounted coaxial with said axis;

said rotor has a ferromagnetic portion with multiple circumferentially spaced protrusions;

said field coil produces homopolar flux in said protrusions when electrically energized;

said airgap armature is located in a magnetic airgap bounded by said protrusions such that said homopolar flux from said protrusions induces an alternating current in said multiple phase windings of said airgap armature when said rotor rotates.

3. An airgap armature for a brushless rotary electrical machine as described in claim 2 wherein:

said multiple phase windings comprise serpentine paths around a circumference that is coaxial with said axis.

4. An airgap armature for a brushless rotary electrical machine as described in claim 3 wherein:

said magnetic airgap is bounded on both sides by said rotor.

5. An airgap armature for a brushless rotary electrical machine as described in claim 1 wherein:

said multiple phase windings comprise serpentine paths around a circumference that is coaxial with said axis.

6. An airgap armature for a brushless rotary electrical machine as described in claim 5 wherein:

said features for holding said end turns of said multiple phase windings comprise through holes in said form wherein said multiple phase windings pass through said through holes while traversing between said active lengths and said end turns.

7. An airgap armature for a brushless rotary electrical machine as described in claim 6 wherein:

only one phase of said multiple phase windings passes through each said through hole.

8. An airgap armature for a brushless rotary electrical machine as described in claim 5 wherein:

said features for holding said end turns of said multiple phase windings comprise pegs on said form wherein said multiple phase windings pass between said pegs while traversing between said active lengths and said end turns.

9. An airgap armature for a brushless rotary electrical machine as described in claim 8 wherein:

only one phase of said multiple phase windings passes between two circumferentially adjacent pegs.

10. An airgap armature for a brushless rotary electrical machine as described in claim 9 wherein:

said multiple phase windings are wound on to said form simultaneously by placement of the phase active lengths of different phases in succession around the circumference of said airgap armature wherein the windings placed in end features alternate phases and the winding direction between end features also alternates.

11. An airgap armature for a brushless rotary electrical machine as described in claim 1 wherein:

said multiple phase windings comprise coils around a circumference that is coaxial with the axis of rotation of the rotor of said brushless rotary electrical machine.

12. An airgap armature for a brushless rotary electrical machine as described in claim 1 wherein:

said brushless rotary electrical machine comprises one or more permanent magnets that drive flux through said multiple phase windings and induce an alternating current in said multiple phase windings as the rotor of said brushless rotary electrical machine rotates.

13. An airgap armature for a brushless rotary electrical machine as described in claim 1 wherein:

said brushless rotary electrical machine has a magnetic airgap that is substantially radial.

14. An airgap armature for a brushless rotary electrical machine as described in claim 13 wherein:

said form is fabricated with said features for holding said end turns of said multiple phase windings while in a substantially flat state;

said form is then rolled to form a circular shape.

15. An airgap armature for a brushless rotary electrical machine as described in claim 14 wherein:

said form is attached to one or more ring structures to hold its circular shape.

16. An airgap armature for a brushless rotary electrical machine as described in claim 14 wherein:

said multiple phase windings are wound on to said form prior to rolling said form in to a circular shape.

17. An airgap armature for a brushless rotary electrical machine as described in claim 1 wherein:

said features for holding said end turns of said multiple phase windings have a circumferential width, W;

the rotor of said brushless rotary electrical machine has a number of same polarity poles, n;

said airgap armature has a number of phases, N, of multiple phase windings; and said airgap armature has a minimum diameter, d, of said active length of said multiple phase windings;

wherein, W is approximately equal to $(\pi\ d)/(2\ n\ N)$.

18. An airgap armature for a brushless rotary electrical machine as described in claim 1 wherein:

said form has a nonplanar cross-section.

19. An airgap armature for a brushless rotary electrical machine as described in claim 18 wherein:

said form has a 'L' shaped cross-section.

20. An airgap armature for a brushless rotary electrical machine as described in claim 18 wherein:

said form has a 'Z' shaped cross-section.

21. An airgap armature for a brushless rotary electrical machine as described in claim 1 wherein:

multiple layers of said multiple phase windings are wound on to said form.

22. An airgap armature for a brushless rotary electrical machine as described in claim 21 wherein:

the first layer of said multiple layers of said multiple phase windings wound on to said form has a shorter active length than subsequent wound layers.

23. An airgap armature for a brushless rotary electrical machine as described in claim 1 wherein:

said brushless rotary electrical machine utilizes multiple forms having multiple phase windings.

24. An airgap armature for a brushless rotary electrical machine as described in claim 23 wherein:

said brushless rotary electrical machine utilizes two forms having multiple phase windings in a single magnetic airgap such that the sides of each said forms having said active lengths of said multiple phase windings are arranged to be facing each other.

25. An airgap armature for a brushless rotary electrical machine as described in claim 1 wherein:

said brushless rotary electrical machine comprises a flywheel energy storage system.

26. An airgap armature for a brushless rotary electrical machine as described in claim 25 wherein:

said multiple phase windings comprise serpentine paths around a circumference that is coaxial with said axis.

27. An airgap armature for a brushless rotary electrical machine as described in claim 26 wherein:

said airgap armature is located in a magnetic airgap that is bounded on both sides by the rotor.

28. An airgap armature for a brushless rotary electrical machine for converting between electrical and mechanical energy, said airgap armature comprising:

multiple phase windings comprised of wires that are wound and bonded onto a form having two ends, each with features for holding end turns of said multiple phase windings;

said multiple phase windings comprising both active lengths and end turns, wherein said active lengths substantially fill the area between said end turns;

said form with said multiple phase windings is mounted in said brushless rotary electrical machine.

29. An airgap armature for a brushless rotary electrical machine as described in claim 28 wherein:

said active lengths of different phases lie on a plane wherein said end turns lie on a different plane or planes in an axial gap brushless rotary electrical machine; and said active lengths of different phases lie on the same diameter wherein said end turns lie on a different diameter or diameters in a radial gap brushless rotary electrical machine.

30. An airgap armature as defined in claim 28, further comprising:

a brushless rotary electrical machine having two surfaces defining an airgap into which said armature is installed, at least one of said surfaces having poles projecting toward said airgap to focus magnetic flux in a rotating array of flux rays through said armature to generate a voltage in said armature windings when said electrical machine is functioning as a generator, and to generate a torque when said armature is functioning as a motor.

31. A method for converting between electrical and mechanical energy in a brushless rotary electrical machine comprising:

inducing alternating current in multiple phases of an airgap armature when the rotor of said brushless rotary electrical machine rotates;

said airgap armature comprises multiple phase windings comprised of wires wound on and bonded to a thin substantially nonmagnetic form having two ends each with features for holding the end turns of said multiple phase windings;

said multiple phase windings comprising both active lengths and end turns, wherein said active lengths are located on one side of said form and said end turns are located on the opposite side of said form.

32. A method for converting between electrical and mechanical energy in a brushless rotary electrical machine as described in claim 31 wherein:

said multiple phase windings comprise serpentine paths around a circumference that is coaxial with said axis.

* * * * *